(12) United States Patent
Jasmin et al.

(10) Patent No.: US 7,300,170 B2
(45) Date of Patent: Nov. 27, 2007

(54) APPARATUS FOR VIEWING AN OPERATING PANEL OF AN ELECTRONIC DEVICE

(75) Inventors: Clyde D. Jasmin, Lexington, KY (US); Ronald C. Knapp, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 203 days.

(21) Appl. No.: 11/036,090

(22) Filed: Jan. 14, 2005

(65) Prior Publication Data

US 2006/0158759 A1    Jul. 20, 2006

(51) Int. Cl.
*G02B 7/182* (2006.01)

(52) U.S. Cl. ...................... 359/880; 359/872

(58) Field of Classification Search ........ 359/855–858, 359/862–865, 869, 872, 881
See application file for complete search history.

(56) References Cited

U.S. PATENT DOCUMENTS

| | | | |
|---|---|---|---|
| 4,573,773 A | 3/1986 | Arndt et al. | |
| 4,981,346 A | 1/1991 | Marschner | |
| 5,214,540 A | 5/1993 | Yakimovsky | |
| 5,940,229 A * | 8/1999 | Baumgarten | 359/839 |
| 6,132,051 A * | 10/2000 | Morell et al. | 359/844 |
| 6,220,717 B1* | 4/2001 | Pastore | 359/871 |
| 6,293,681 B1* | 9/2001 | Frank | 359/871 |
| 6,317,279 B1 | 11/2001 | Chiang | |
| 6,400,503 B1 | 6/2002 | Mickelson | |
| 2004/0047052 A1* | 3/2004 | Zadro | 359/855 |

* cited by examiner

*Primary Examiner*—Scott J. Sugarman
*Assistant Examiner*—DaWayne A Pinkney
(74) *Attorney, Agent, or Firm*—Thompson Hine

(57) ABSTRACT

Some embodiments of the present invention provide an apparatus for viewing the operating panel of an electronic device, such as a printer, scanner, copy machine, facsimile machine, multi-function device and the like, wherein the apparatus is adapted to allow a person to view the operating panel from a line of sight that extends from an elevation lower than an elevation of the operating panel. The apparatus can reflect and/or refract an image of the operating panel to place it within the line of sight of the person, and can use one or more mirrors and/or prisms to perform this function.

22 Claims, 3 Drawing Sheets

APPARATUS FOR VIEWING AN OPERATING PANEL OF AN ELECTRONIC DEVICE

BACKGROUND OF THE INVENTION

Some printers and other computer equipment have operating panels that are positioned on an upper surface of the equipment, are positioned in an upward facing direction, or are otherwise not visible or easily viewed from an elevation beside or lower than the equipment. When this type of equipment is placed on an elevated surface, some users of the equipment may not have an appropriate line of sight to view the operating panel. Accordingly, such users can have a difficult time using the equipment due to the inability to view the operating panel.

SUMMARY OF THE INVENTION

The present invention relates to an apparatus for viewing the operating panel of an electronic device, such as a printer, scanner, copy machine, facsimile machine, multi-function device, and the like. The apparatus is adapted to allow a person to view the operating panel from a line of sight that extends from an elevation lower than an elevation of the operating panel. Specifically, the apparatus reflects and/or refracts an image of the operating panel to place it within the line of sight of the person. The apparatus can use one or more mirrors, prisms, and the like to reflect and/or refract the image of the operating panel.

Some embodiments of the present invention provide a viewing apparatus for use with an electronic device having an operating panel, wherein the viewing apparatus is adapted to allow a person to view the operating panel from a line of sight that extends from an elevation lower than an elevation of the operating panel, and wherein the viewing apparatus comprises an adjustable neck having a first end coupled to the device and a second end movable with respect to the first end, the neck having at least one joint permitting movement of the first end of the neck to different positions with respect to the second end of the neck; and a mirror coupled to the second end of the adjustable neck, the mirror positionable to place an image of the operating panel within different lines of sight of the person.

In some embodiments, an apparatus for viewing an operating panel of an electronic device is provided, wherein the electronic device has a wall and is supported in an elevated position by a support, and wherein the apparatus comprises a base adapted to be coupled to at least one of the wall of the electronic device and the support; an elongated neck extending from the base, the elongated neck comprising a first end coupled to the base; and a second end; and a head coupled to the second end of the elongated neck and adjustable to different positions with respect to the electronic device, the head comprising at least one of a mirror and a prism movable to different positions by adjustment of the head; wherein the head is positionable to at least one position in which a line of sight external to the elongated neck extends from a user's location at a lower elevation than the head to the operating panel of the electronic device via the at least one of the mirror and the prism.

Some embodiments of the present invention provide a viewing apparatus for use with an electronic device having an operating panel, wherein the viewing apparatus is adapted to allow a person to view the operating panel from a line of sight that extends from an elevation lower than an elevation of the operating panel, and wherein the viewing apparatus comprises a neck having first and second ends, wherein the first end of the neck is connectable to the electronic device; and a viewing assembly coupled to the second end of the neck.

Further aspects of the present invention, together with the organization and operation thereof, will become apparent from the following detailed description of the invention when taken in conjunction with the accompanying drawings.

BRIEF DESCRIPTION OF THE DRAWINGS

In the drawings, wherein like reference numerals indicate like parts.

DETAILED DESCRIPTION

Figure 1:
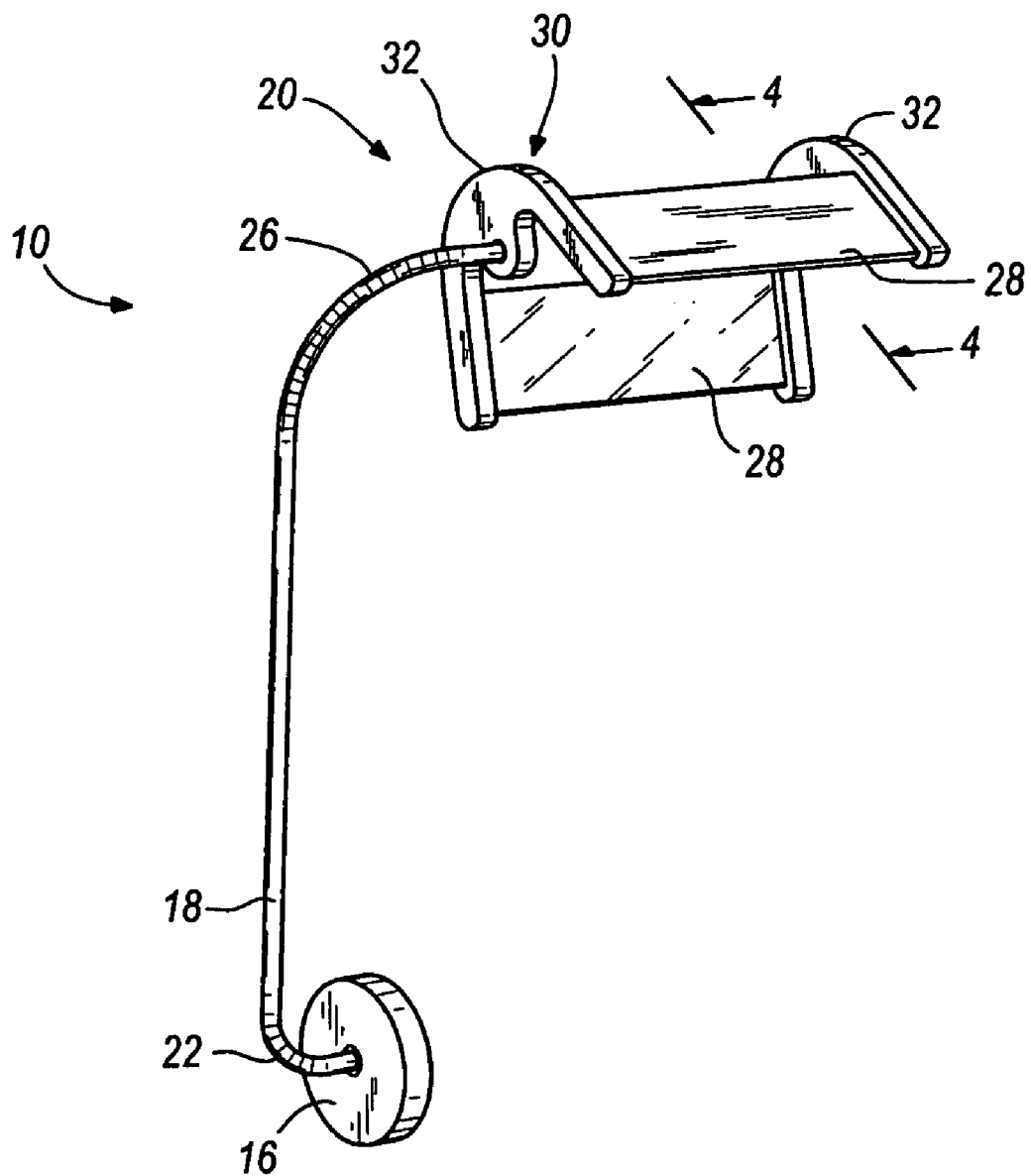
FIG. 1 is a perspective view of an apparatus for viewing the operating panel of an electronic device.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use herein of "including," "comprising," or "having" and variations thereof is meant to encompass the items listed thereafter and equivalents thereof as well as additional items. The terms "mounted," "connected," and "coupled" are used broadly and encompass both direct and indirect mounting, connecting and coupling. Further, "connected" and "coupled" are not restricted to physical or mechanical connections or couplings and can include electrical connections or couplings, whether direct or indirect. Finally, as described in subsequent paragraphs, the specific mechanical configurations illustrated in the drawings are intended to exemplify embodiments of the invention. Accordingly, other alternative mechanical configurations are possible, and fall within the spirit and scope of the present invention.

An apparatus 10 for viewing the operating panel 12 of an electronic device 14 is shown in FIGS. 1-4. The apparatus 10 can be used with any electronic device 14 having an operating panel, including without limitation printers, scanners, copy machines, facsimile machines, multi-function device, and the like, many of which can be computer peripheral devices. The operating panel 12 can comprise any number and types of controls, including without limitation buttons, knobs, switches, slides, touch screens, and the like. Also or alternatively, the operating panel 12 can comprise any number and types of indicators, including without limitation display panels, indicator lights, and the like.

Figure 2:
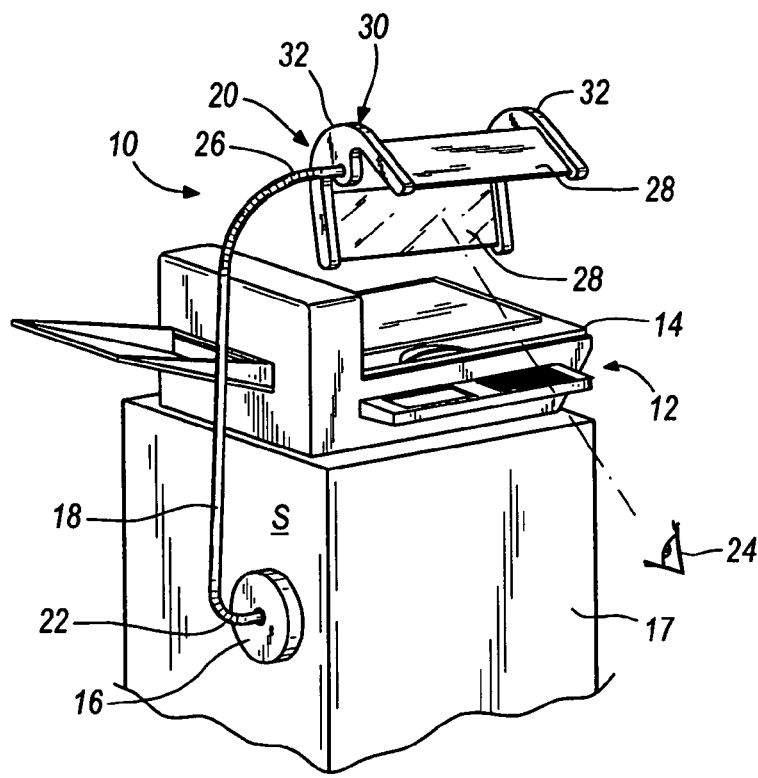
FIG. 2 is a perspective view of the apparatus illustrated in FIG. 1, shown connected to a support supporting an electronic device in an elevated position.
Figure 3:
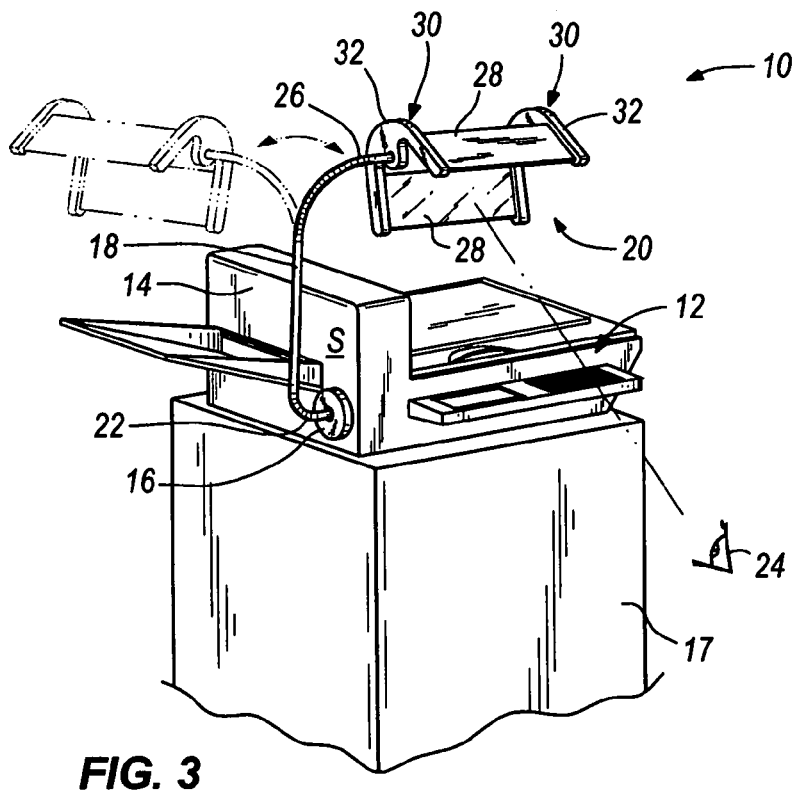
FIG. 3 is a perspective view of the apparatus illustrated in FIG. 1, shown mounted in another configuration.

The viewing apparatus 10 illustrated in FIGS. 1-4 includes a base 16, a support member or neck 18 coupled to the base 16, and a viewing assembly or head 20 coupled to the neck 18. As illustrated in FIGS. 2 and 3, the viewing apparatus 10 can be connected to a variety of surfaces. Furthermore, as best illustrated in FIG. 3, the viewing apparatus 10 can be adjusted to a variety of positions.

The base 16 of the viewing apparatus 10 can connect the viewing apparatus 10 to a support surface S. The support surface S can be a surface of an element or structure supporting the electronic device, such as a table, rack, stand, frame, or other structure (hereinafter referred to as a "support" 17). For example, the base 16 illustrated in FIG. 2 is attached to a vertically oriented support surface S of a support 17 located below and supporting the electronic device 14. In other embodiments, the support surface S can be any surface of the electronic device 14. For example, the base 16 illustrated in FIG. 3 is connected directly to the electronic device 14. Although not illustrated, in still other embodiments, the base 16 can be attached to other support surfaces S near the electronic device 14, such as an adjacent wall or ceiling. It should be noted that the support surface S can have any orientation, including vertical orientations (see FIGS. 2 and 3) and horizontal or diagonal orientations.

The base 16 of the viewing apparatus 10 can be connected to the support surface S in any of a number of different ways. For example, the base 16 can be attached to the support surface S by one or more screws, nuts and bolts, pins, rivets, or other conventional fasteners, joints, adhesive or cohesive bonding material, inter-engaging elements on the base 16 and support surface S, clamps, clips, threaded or snap-fit connections, one or more magnets (for connection to one or more magnets on the support surface S and/or one or more surfaces of steel, iron, or other material to which magnets are attracted), and the like. In some embodiments, the base 16 can be weighted to allow the base 16 to rest on a support surface S without further elements or structure securing the base 16 thereto. Accordingly, the base 16 in some embodiments can be coupled to the support surface S by gravity and frictional forces. The specific type of attachment mechanism utilized to connect the base 16 to the support surface S may be dependent upon the type and characteristics of the support surface S (e.g., metal, wood, plastic, or other support surface materials, vertical or horizontal support surfaces, and the like).

The base 16 illustrated in FIGS. 1-3 is substantially disc-shaped, and has a substantially flat surface that can be secured against the support surface S. In other embodiments, the base 16 can take any other form desired, such as a C-clamp to sandwich a portion of the support surface S between two jaws of the clamp, an apertured plate through which fasteners are passed into the support surface S, and the like. The base 16 can take still other forms based at least in part upon the manner in which the base 16 is to be connected to the support surface S, each of which falls within the spirit and scope of the present invention.

With continued reference to FIGS. 1-3, the base 16 is coupled to one end 22 of the neck 18 of the viewing apparatus 10. The base 16 and neck 18 can be coupled together in any manner, including those described above with reference to the connection between the base 16 and the support surface S. In some embodiments, the base 16 and neck 18 are connected by a joint allowing relative movement between the base 16 and neck 18. For example, the neck 18 illustrated in FIGS. 1-3 is received within an aperture in the base 16, and is pivotable with respect to the base 16. Alternatively, the neck 18 can be rigidly fixed to the base 16, allowing substantially no relative movement between the neck 18 and the base 16. In some embodiments, the neck 18 can have a projection that is received within an aperture of the base 16.

In some embodiments, the neck 18 is adjustable in order to permit movement of the viewing assembly 20 with respect to the base 16. For this purpose, the neck 18 illustrated in FIGS. 1-3 is flexible, and can be constructed of any flexible rod or tubing sufficiently stiff to retain the viewing assembly 20 in place after being positioned in a desired location. In other embodiments, the neck 18 has one or more members connected to each other by one or more articulated joints, such as two or more arms connected to each other at one or more pivotable joints. Accordingly, the arms can be moved relative to each other about the joint(s) to reposition and re-orient the viewing assembly 20. In some embodiments, the neck 18 has a gooseneck multiple-segment and multiple-jointed construction. With such a construction, the neck 18 can be adjusted to different positions and orientations. In this manner, the orientation of the viewing assembly 20 can be adjusted to change the line of sight of an operator 24. Also in this manner, the location of the viewing assembly 20 relative to the electronic device 14 can be adjusted (e.g., to move the viewing assembly 20 away from or toward the operating panel 12).

As shown in FIGS. 1-3, the second end 26 of the neck 18 is coupled to the viewing assembly 20 and can be coupled to the viewing assembly 20 in any of the manners described above with reference to the connection between the neck 18 and the base 16. In some embodiments, for example, the viewing assembly 20 is pivotably coupled to the neck 18, thereby enabling the viewing assembly 20 to be adjusted to different positions and orientations with respect to the neck 18 and the operating panel 12. Alternatively, the viewing assembly 20 can be rigidly fixed to the neck 18.

The viewing assembly 20 can include one or more reflective or refractive viewing elements, such as mirrors, prisms, or lenses. Such elements can be directly coupled to the neck 18 in any of the manners described above with reference to the connection between the base 16 and the support surface S. As described in greater detail below, the reflective or refractive viewing elements can instead be secured to a frame, in which case the frame can be coupled to the neck 18 in any of the manners described above with reference to the connection between the base 16 and the support surface S.

Figure 4:
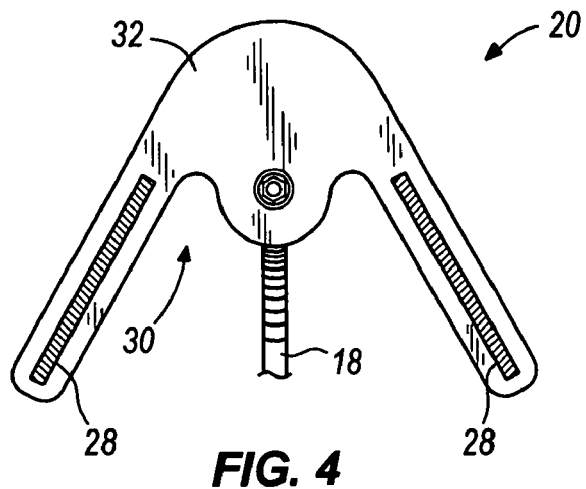
FIG. 4 is a cross-sectional view taken along line 4-4 of FIG. 1, showing features of the viewing assembly for reflecting an image of an operating panel.
Figure 5:
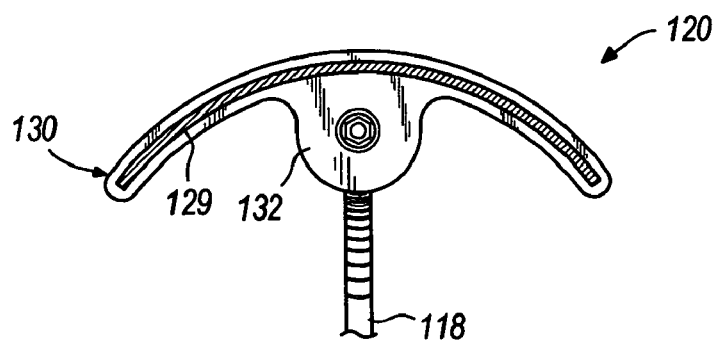
FIG. 5 is a cross-sectional view of a viewing assembly according to another embodiment of the present invention.
Figure 6:
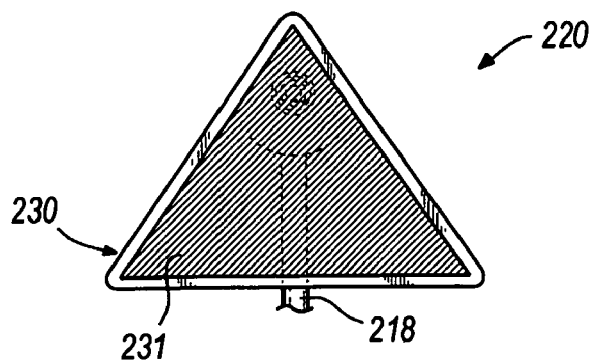
FIG. 6 is a cross-sectional view of a viewing assembly according to yet another embodiment of the present invention.

With reference to the embodiment of FIGS. 1-4, in some embodiments, the viewing assembly 20 comprises one or more mirrors 28 directly or indirectly coupled to the neck 18 (e.g., via a frame 30) to reflect an image of the operating panel 12 to a desired sight line. Any mirror type or combination of mirror types can be employed for this purpose. For example, the viewing assembly 20 can have one or more mirrors 28 having a planar reflecting surface as shown in FIG. 4. In other embodiments, the viewing assembly can have concave and/or convex reflecting surfaces, such as surfaces of one or more concave and/or convex mirrors. For example, the viewing assembly 120 illustrated in FIG. 5 has a frame 130 coupled to a neck 118 and supporting a concave mirror 129. In some embodiments, the viewing assembly can have one or more prisms and/or lenses used alone or in conjunction with one or more mirrors. Such prisms and/or lenses can be used to refract an image of the operating panel 12 to a desired sight line. For example, the viewing assembly 220 illustrated in FIG. 6 has a frame 230 coupled to a neck 218 and supporting a triangular prism 231. In other embodiments, any other type and shape of prism 231 or lens capable of refracting the image of the operating panel 12 to a desired sight line can instead be used.

If employed, the frame 30, 130, 230 can have any shape and size suitable for supporting the mirror(s) 28, 129, prism(s) 231, and lens(es). The frame 30, 130, 230 can include a variety of structure members, such as plates, wires, arms, rods, and the like. For example, the frames 30, 130 illustrated in FIGS. 4 and 5 includes two portions 32, 132 at opposite ends of the mirrors 28, 129 and connected by the mirrors 28, 129. Any frame shape can be employed to hold the mirrors 28, 129 (or prisms or lenses, in other embodiments) in desired positions and orientations in the viewing assembly 20, 120. The frame 30, 130, 230 can be shaped to hold any combination of mirrors 28, 129, prisms 231, and lenses in position with respect to one another, thereby establishing a desired sight line extending from the operating panel 12 to the viewing assembly 20, 120, 220, and thereafter to a user.

With reference again to the embodiment illustrated in FIGS. 1-4, in some embodiments, at least two mirrors 28 of the viewing assembly 20 are oriented at an angle of less than 180 degrees and greater than 0 degrees with respect to one another in order to establish a desired sight line as just discussed. Also, in some embodiments, at least two mirrors 28 of the viewing assembly 20 are oriented at an angle of less than 90 degrees and greater than 0 degrees with respect to one another in order to establish a desired sight line. With reference to the embodiment illustrated in FIG. 5, in other embodiments, one portion of a concave mirror 129 is oriented at an angle of less than 180 degrees and greater than 0 degrees with respect to another portion of the same concave mirror 129 in order to establish a desired sight line. Also, in some embodiments, one portion of a concave mirror is oriented at an angle of less than 90 degrees and greater than 0 degrees with respect to another portion of the same concave mirror in order to establish a desired sight line.

The mirror(s) 28, 129, prism(s) 231, and/or lens(es) can be fixed against movement relative to the frame 30, 130, 230. However, in other embodiments, one or more of these elements can be movable with respect to the frame 30, 130, 230, thereby changing the manner in which the viewing assembly reflects and/or refracts images.

During operation of the viewing apparatus 10 illustrated in FIGS. 1-4, an operator 24 of the electronic device 14 can have a line of sight that extends from a location lower than an elevation of the operating panel 12. The operator 24 can adjust the viewing apparatus 10 to bring an image of the operating panel 12 (reflected by the viewing assembly 20) to a line of sight of the operator 24. Depending upon the specific construction of the viewing apparatus 10, the operator 24 can adjust one or more of the following to perform this function: the position and/or orientation of the base 16; the orientation of the neck 18 relative to the base 16; the position and/or orientation of one portion of the neck 18 with respect to another portion of the neck 18; the position and/or orientation of the viewing assembly 20 with respect to the neck 18; and the position and/or orientation of the mirrors 28 relative to the frame 30.

As shown in FIG. 3, in some embodiments the viewing apparatus 10 can also be moved out of the way of other users that do not need to use the viewing apparatus 10. For example, the viewing apparatus shown in FIG. 3 can be pivoted between use and non-use positions. In another example, the neck 18 may be retractable. In yet other examples, the neck 18 can be pivoted with respect to the base 16 and/or the viewing assembly 20 can be pivoted with respect to the neck 18 to perform this function.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

Various features of the invention are set forth in the following claims.

What is claimed is:

1. A viewing apparatus for use with an electronic device having an operating panel, the viewing apparatus adapted to allow a person to view the operating panel from a line of sight that extends from an elevation lower than an elevation of the operating panel, the viewing apparatus comprising:
    an adjustable neck having a first end coupled to the device and a second end movable with respect to the first end, the neck having at least one joint permitting movement of the first end of the neck to different positions with respect to the second end of the neck; and
    a mirror coupled to the second end of the adjustable neck, the mirror having a concave reflecting surface and being positionable to both reflect an image of an operating panel located generally below the mirror into another portion of the mirror and to re-reflect the reflected image towards a line of sight extending from an elevation lower than the elevation of the operating panel.

2. The viewing apparatus of claim 1, the viewing device further comprising a frame to which the mirror is coupled.

3. The viewing apparatus of claim 2, wherein the mirror is pivotally coupled to the frame.

4. The viewing apparatus of claim 2, wherein the frame is pivotally coupled to the adjustable neck.

5. The viewing apparatus of claim 1, wherein the first end of the adjustable neck is coupled to the electronic device via a support supporting the electronic device.

6. The viewing apparatus of claim 1, wherein the mirror is positioned at a higher elevation than the first end of the adjustable neck to position an image of the operating panel within the line of sight of the person.

7. An apparatus for viewing an operating panel of an electronic device, the electronic device having a wall and supported in an elevated position by a support, the apparatus comprising:
    a base adapted to be coupled to at least one of the wall of the electronic device and the support;
    an elongated neck extending from the base, the elongated neck comprising
        a first end coupled to the base; and
        a second end; and
    a head coupled to the second end of the elongated neck and adjustable to different positions with respect to the electronic device, the head comprising a prism movable to different positions by adjustment of the head, wherein the head is positionable to at least one position in which a line of sight external to the elongated neck extends from a user's location at a lower elevation than the head to the operating panel of the electronic device via the prism.

8. The apparatus of claim 7, wherein the head comprises:
a frame; and
a prism coupled to the frame and positionable so that an image of the operating panel is refracted towards a line of sight extending from an elevation lower than the elevation of the operating panel.

9. The apparatus of claim 8, wherein the prism is pivotally coupled to the frame.

10. The apparatus of claim 8, wherein the frame is pivotally coupled to the elongated neck.

11. A method for enabling a user to view a generally upward facing operating panel of an electronic device from a line of sight that extends from an elevation lower than an elevation of the operating panel, the method comprising:
providing an apparatus having a neck with first and second ends, wherein the first end of the neck is connectable to an electronic device with an operating panel, and a viewing assembly coupled to the second end of the neck;
positioning the viewing assembly with respect to the electronic device such that said viewing assembly is positioned at a higher elevation than the elevation of the operating panel to redirect an image of the operating panel along a line of sight to a user located at a lower elevation than the elevation of the operating panel.

12. The method of claim 11 wherein the viewing assembly comprises at least one of a mirror and a prism coupled to the second end of the neck and movable to different positions with respect to the operating panel of the electronic device by moving the neck, and wherein the line of sight is adjustable by moving the at least one of a mirror and a prism to different positions with respect to the operating panel of the electronic device.

13. The method of claim 11 wherein the neck is flexible; and positioning the viewing assembly further comprises flexing the neck.

14. The method of claim 12, wherein the viewing assembly further comprises a frame coupled to the at least one of a mirror and a prism.

15. The method of claim 14, wherein the at least one of a mirror and a prism are pivotally coupled to the frame, and wherein positioning the viewing assembly further comprises pivoting the at least one of a mirror and a prism with respect to the frame.

16. The method of claim 11, wherein the first end of the neck is connectable to the electronic device via a support supporting the electronic device.

17. The method of claim 16, wherein the apparatus includes a joint allowing relative movement between the support and the first end of the neck, and wherein positioning the viewing assembly further comprises operating the joint.

18. The method of claim 11, wherein the apparatus includes a joint allowing relative movement between the second end of the neck and the viewing assembly, and wherein positioning the viewing assembly further comprises operating the joint.

19. The method of claim 11, wherein the neck further comprises:
a first portion; and
a second portion coupled to the first portion by a joint such that the first portion is movable with respect to the second portion about the joint.

20. The method of claim 12, wherein the viewing assembly comprises at least one mirror with a substantially planar reflective surface.

21. The method of claim 12, wherein the viewing assembly comprises a mirror including a concave reflecting surface.

22. The method of claim 12, wherein the viewing assembly comprises a prism.

* * * * *